Mar. 13, 1923.
F. A. NAUTS
HUB
Filed Mar. 6, 1922
1,448,312
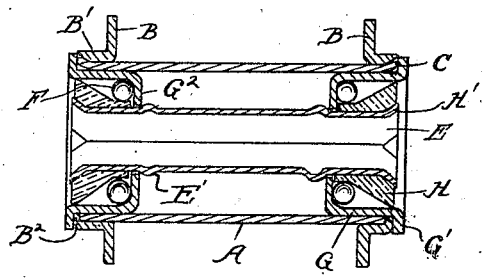
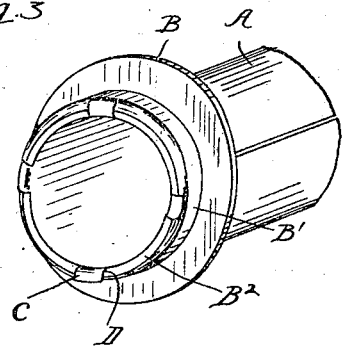
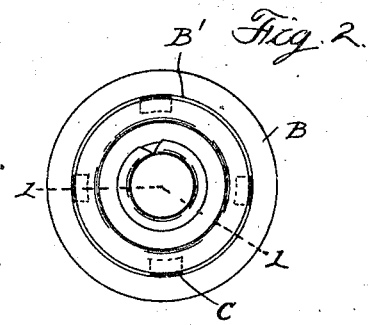
Inventor
Frank A. Nauts
By Whittemore Hulbert Whittemore
+Belknap   Attorneys Patented Mar. 13, 1923.

1,448,312

UNITED STATES PATENT OFFICE.

FRANK A. NAUTS, OF TOLEDO, OHIO, ASSIGNOR TO THE GENDRON WHEEL COMPANY, OF TOLEDO, OHIO, A CORPORATION OF OHIO.

HUB.

Application filed March 6, 1922. Serial No. 541,625.

*To all whom it may concern:*

Be it known that I, FRANK A. NAUTS, a citizen of the United States of America, residing at Toledo, in the county of Lucas and State of Ohio, have invented certain new and useful Improvements in Hubs, of which the following is a specification, reference being had therein to the accompanying drawings.

This invention relates to wheel hubs, and relates particularly to hubs for velocipede wheels.

It is the object of the invention to provide a wheel hub comprising a sleeve or barrel, rolled preferably from a sheet metal stamping, and flange members also stamped from sheet metal engaging the ends of said barrel and interlocked therewith to restrain them from either rotative or longitudinal movement relative to the barrel.

A further object is to provide an improved ball-bearing assembly for a wheel hub.

In the drawings:—

Figure 1 is an axial sectional view of the improved hub, the plane of section being taken on line 1—1 on Figure 2;

Figure 2 is an end view of the same;

Figure 3 is a perspective view of one end of the hub omitting the ball race.

In these views the reference character A designates a sleeve or a barrel which may be formed from stamped sheet metal rolled to the proper cylindrical form. The ends of the barrel A are respectively embraced by flange members B to engage the wheel body (not shown). Each flange member preferably has an intermediate cylindrical portion B' seating upon the sleeve A and an inner-marginal portion B² over-lapping the adjacent end of said sleeve, so as to register the central aperture of the flange member with the opening of the sleeve. Any shifting of the flange members toward each other is prevented by the inner portions B² thereof and to prevent any outward shifting or rotation of said members relative to the barrel A the ends of the latter are formed with tongues C which are outwardly bent to engage the notches D in said flange members.

To facilitate mounting of the wheel comprising the described hub upon an axle (not shown) there is provided the tubular journal member E centrally disposed within the sleeve A to engage the axle. Between the end portions of the sleeve A and journal member E ball-bearings are arranged comprising the balls F and retainers G and H. The members G have the nature of bushings formed from sheet metal and tightly pressed into the ends of the barrel A, the outer ends of said bushing being out-turned as indicated at G' to over-lap the inturned portions B² of the flange members. The inner extremities of the bushings G are flanged inwardly, as indicated at G² restraining the balls F from shifting inwardly. Humps or crimps E' on the journal member E engage the inner edge of these flanges G² to prevent their spreading and to maintain them in abutting relation with the inner ends of the retainers H. Outward shifting of the balls is prevented by coning the exterior faces of the retainers H which are pressed upon the ends of the journal member E, the latter being terminally flared out, as indicated at H' to retain the member H.

The described construction establishes a very rigid relation between the barrel and flange members of the hub while permitting said parts to be separately stamped from sheet metal thus minimizing the cost of production. The ball-bearing assembly is also one that lends itself to rapid assembly and comparatively inexpensive quantity production.

What I claim as my invention is:—

1. A wheel hub comprising a sleeve, a journal member formed of sheet metal centrally disposed within the sleeve, a set of anti-friction elements, and retainers for said elements pressed into rigid engagement to form a unitary structure with said sleeve and journal members, one of said retainers providing a flange and the other a conical face between which said anti-friction elements are engaged.

2. A unitary wheel hub structure comprising a sleeve, a sheet metal journal member centrally disposed within said sleeve, a set of anti-friction elements between said journal member and sleeve, an outer retainer member for said elements pressed upon the journal member and presenting a coned face to said elements, and a bushing pressed into said sleeve and inwardly flanged to form an inner retainer for said elements.

3. A wheel hub comprising a sleeve, a central journal member, a set of anti-friction elements between said journal member and sleeve, a bushing pressed into said sleeve and having its ends flanged inwardly and outwardly to respectively engage the outer end of the sleeve and to provide an inner retainer for said anti-friction elements, a coacting outer retainer carried by the journal member and means on said journal member for retaining said bushing and coacting outer retainer in desired relation.

4. A wheel hub comprising a sleeve, a journal member centrally disposed within the sleeve, a set of anti-friction elements, retainers for said elements pressed into rigid engagement with said sleeve and journal member for holding said retainers in desired relation and forming a unitary structure.

5. A wheel hub comprising a sleeve, a journal member centrally disposed within the sleeve, a set of anti-friction elements, retainers for said elements pressed into rigid engagement with said sleeve and journal members, and shouldered portions formed on said journal member for locking said retainers in position.

In testimony whereof I affix my signature.

FRANK A. NAUTS.